United States Patent
Tanuma et al.

(10) Patent No.: US 7,987,706 B2
(45) Date of Patent: Aug. 2, 2011

(54) TIRE AIR-PRESSURE SENSOR

(75) Inventors: Hiroshi Tanuma, Gunma (JP); Naoki Saito, Gunma (JP)

(73) Assignee: Yokowo Co., Ltd., Tokyo (JP)

( * ) Notice: Subject to any disclaimer, the term of this patent is extended or adjusted under 35 U.S.C. 154(b) by 0 days.

(21) Appl. No.: 12/303,884

(22) PCT Filed: May 24, 2007

(86) PCT No.: PCT/JP2007/061034
§ 371 (c)(1),
(2), (4) Date: Apr. 15, 2009

(87) PCT Pub. No.: WO2007/142103
PCT Pub. Date: Dec. 13, 2007

(65) Prior Publication Data
US 2010/0236325 A1    Sep. 23, 2010

(30) Foreign Application Priority Data

Jun. 8, 2006    (JP) .............................. P.2006-159508

(51) Int. Cl.
*G01L 7/00* (2006.01)
(52) U.S. Cl. ......................................... 73/146.3; 73/146
(58) Field of Classification Search .................. None
See application file for complete search history.

(56) References Cited

U.S. PATENT DOCUMENTS

| 4,866,982 A * | 9/1989 | Gault | 73/146.5 |
| 5,033,296 A * | 7/1991 | Huang | 73/146.8 |
| 5,142,904 A * | 9/1992 | Le | 73/146.8 |
| 5,814,725 A * | 9/1998 | Furuichi et al. | 73/146.5 |
| 2002/0046599 A1 | 4/2002 | Chuang et al. | |

FOREIGN PATENT DOCUMENTS

| JP | 2002-144830 | 5/2002 |
| JP | 2003-146033 | 5/2003 |
| JP | 2005-047466 | 2/2005 |
| JP | 2005-257297 | 9/2005 |
| JP | 2007-296966 | 11/2007 |

* cited by examiner

*Primary Examiner* — Lisa M Caputo
*Assistant Examiner* — Jermaine Jenkins
(74) *Attorney, Agent, or Firm* — Morgan, Lewis & Bockius LLP

(57) ABSTRACT

The present invention provides a tire air-pressure sensor (30) in which water is hard to intrude into a communication passage (36) communicating with a sensor portion (18a) of an air-pressure sensor element (18) and in which water having intruded into the communication passage (36) is discharged out of a case (32). Two air holes (34), (34) are formed in a crest portion of the case (32) of the tire air-pressure sensor (30) arranged and fixed in a wheel (10) in a manner to be positionally shifted in a rotating direction of the wheel (10), and an opening of an air vent hole (16) is formed in a cap (38) which is put on the air-pressure sensor element (18) arranged in the case (32), at an intermediate position between the two air holes (34), (34) in the rotating direction. The two air holes (34), (34) and the opening of the air vent hole (16) are brought into communication by the communication passage (36) on a substantial plane normal to the radial direction of the wheel (10), between the crest portion of the case (32) and the cap (38). Walls (40) are interposed between the air holes (34), (34) and the opening of the air vent hole (16) so as to bring the communication passage (36) into a meandering state.

7 Claims, 8 Drawing Sheets

TIRE AIR-PRESSURE SENSOR

TECHNICAL FIELD

The present invention relates to a tire air-pressure sensor in which water having intruded into a tire is prevented from adhering to an air-pressure sensor element for detecting the air pressure of the air containing tire of a vehicle.

BACKGROUND ART

An example of a tire air-pressure sensor in the prior art will be briefly described with reference to FIGS. 10 through 12. FIG. 10 is an external appearance perspective view in the case where the prior-art tire air-pressure sensor is arranged and fixed in a wheel. FIG. 11 is a sectional partial view in a radial direction, in the case where a tire is attached to a structure in FIG. 10. FIG. 12 is an enlarged view of that part of an air-pressure sensor element which corresponds to a section A-A in FIG. 10.

Referring to FIGS. 10 through 12, the tire air-pressure sensor 12 is arranged and fixed in a wheel 10 by a band 14. The tire air-pressure sensor 12 is arranged so that its crest side may lie on the outer side of the wheel 10 in the radial direction thereof, and one air vent hole 16 is formed in the crest portion of the case 26 of the tire air-pressure sensor. The air-pressure sensor element 18 is arranged within the case 26, the air vent hole 16 is formed so as to communicate with the sensor portion 18a of the air-pressure sensor element, and an air pressure in the tire 20 acts on the sensor portion 18a of the air-pressure sensor element 18 through the air vent hole 16, thereby to be detected. Incidentally, a circuit board 22 is disposed in the case 26, the air-pressure sensor element 18 is mounted on the circuit board 22, while a transmitter and a battery, not shown, are mounted thereon, and the interior of the case 26 is molded with a resin 24 for the purpose of waterproofness, whereby the tire air-pressure sensor 12 is configured. A signal which corresponds to the air pressure detected by the air-pressure sensor element 18 is appropriately transmitted to a receiver in a vehicle, and the air pressure in the tire 20 is monitored.

Those structures of the tire air-pressure sensor 12 in which, likewise to such a prior-art structure, the air pressure in the tire 20 is exerted on the sensor portion 18a of the air-pressure sensor 18 through the air vent hole 16 of simple shape, are disclosed in JP-A-2002-1440, JP-A-2005-47466, etc.

Technical Problem

With the prior-art structures as stated above, when has intruded into the tire 20 for any cause, it might further intrude into the case 26 via the air vent hole 16 and might adhere the sensor portion 18a of the air-pressure sensor element 18. In a case where the water have adhered, the detection sensitivity of the air-pressure sensor element 18 might be lowered, and any abnormality might occur in the detection value of the air-pressure sensor element. Incidentally, the technique disclosed in Patent Document 2 intends to prevent the intrusion of the water by setting the diametrical dimension of the air vent hole 16 at or below a diameter of 0.5 mm, but it is not satisfactory.

The present invention has been made in view of the circumstances of the prior-art techniques as stated above, and it is the object of the present invention to provide a tire air-pressure sensor in which water is hard to intrude into a communication passage where an air pressure in a tire communicates with the sensor portion of an air-pressure sensor element in a case, and in which water having intruded into the communication passage is discharged out of the case.

DISCLOSURE OF THE INVENTION

The tire air-pressure sensor of the present invention is so configured that the tire air-pressure sensor is arranged and fixed in a wheel its outer side in a radial direction the wheel located as a crest side; that two air holes are formed in a crest portion of a case of the tire air-pressure sensor in a manner to be positionally shifted in a rotating direction of the wheel; that an opening of an air vent hole communicating with an air-pressure sensor element is formed in a cap which is put on the air-pressure sensor element arranged in the case, at an intermediate position between the two air holes in the rotating direction; that the two air holes and the opening of the air vent hole are brought into communication by a communication passage on a substantial plane normal to the radial direction of the wheel, between the crest portion of the case and the cap; and that walls are interposed between the air holes and the opening of the air vent hole so as to bring the communication passage into a meandering state. Therefore, even when water within a tire has intruded from the air hole into the case, it cannot easily move onto the side of the air vent hole leading to the air-pressure sensor element, for the reason that the communication passage is in the meandering state. Moreover, the communication passage lies on the substantial horizontal surface normal to the radial direction of the wheel, a distance from the rotation axis of the wheel to each of the two air holes is longer than a distance to the air vent hole, though slightly, and a component force in a direction from the side of the air vent hole to the side the air hole acts on centrifugal forces acting on the air hole side during the rotation of the wheel, so that water having intruded into the communication passage is moved onto the air hole side and discharged into the tire by the component force. Consequently, water does not adhere to the sensor portion of the air-pressure sensor element.

In addition, the tire air-pressure sensor may well be so configured that the communication passage becomes symmetric in the rotating direction with respect to the opening of the air vent hole. The communication passage is symmetric in the rotating direction with respect to the opening of the air vent hole, and water having intruded into the communication passage undergoes the same air pressures from the sides of the two air holes, respectively, whereby the water having intruded into the communication passage does not move due to a pressure change in the tire, or the like.

Besides, the tire air-pressure sensor can also be so configured that the surface of the communication passage on the crest side forms part of a spherical surface which is convex onto an inner side in the radial direction and which comes nearest to the opening of the air vent hole. Also, the tire air-pressure sensor can also be so configured that a surface of the communication passage on the crest side forms part of a conical surface which is convex onto an inner side in the radial direction and which has an apex at a position confronting the opening of the air vent hole. In either of the configurations, the surface of the communication passage on the crest side forms part of the spherical surface or the conical surface, so that water having intruded into the communication passage is more reliably moved onto the air hole side and discharged into the tire by the component force of the centrifugal forces exerted on the water within the communication passage by the rotation of the wheel as extends along the spherical surface or the conical surface.

Besides, the tire air-pressure sensor can also be so configured that a surface of the communication passage on the crest side forms part of a cylindrical surface which is convex onto an inner side in the radial direction, which has an axis parallel to a rotation axis of the wheel and which comes nearest to the opening of the air vent hole. Also, the tire air-pressure sensor can also be so configured that a surface of the communication passage on the crest side forms parts of two oblique surfaces which are convex onto an inner side in the radial direction, which have edges parallel to a rotation axis of the wheel at a position confronting the opening of the air vent hole and which form a V-shaped section. In either of the configurations, the surface of the communication passage on the crest side forms part(s) of the cylindrical surface or the two oblique surfaces forming the V-shaped section, so that water having intruded into the communication passage is more reliably moved onto the air hole side and discharged into the tire by the component forces of the centrifugal forces exerted on the water within the communication passage by the rotation of the wheel as extend toward the air holes along the cylindrical surface or the two oblique surfaces.

Further, the tire air-pressure sensor can also be so configured that a surface of the communication passage facing an air vent hole side of the walls becomes longer in a straight distance from the opening of the air vent hole as a passage length of the communication passage from the opening of the air vent hole is larger. Owing to such a configuration, the surface of the communication passage on the crest side forms part of the spherical surface or the conical surface, and the straight distance from the opening of the air vent hole becomes longer as the passage length of the communication passage from the opening of the air vent hole is larger, so that water having intruded into the communication passage is moved onto the air hole side in the communication passage by the component force of the centrifugal forces exerted on the water within the communication passage by the rotation of the wheel as extends along the spherical surface or the conical surface.

BEST MODE FOR CARRYING OUT THE INVENTION

Figure 1:
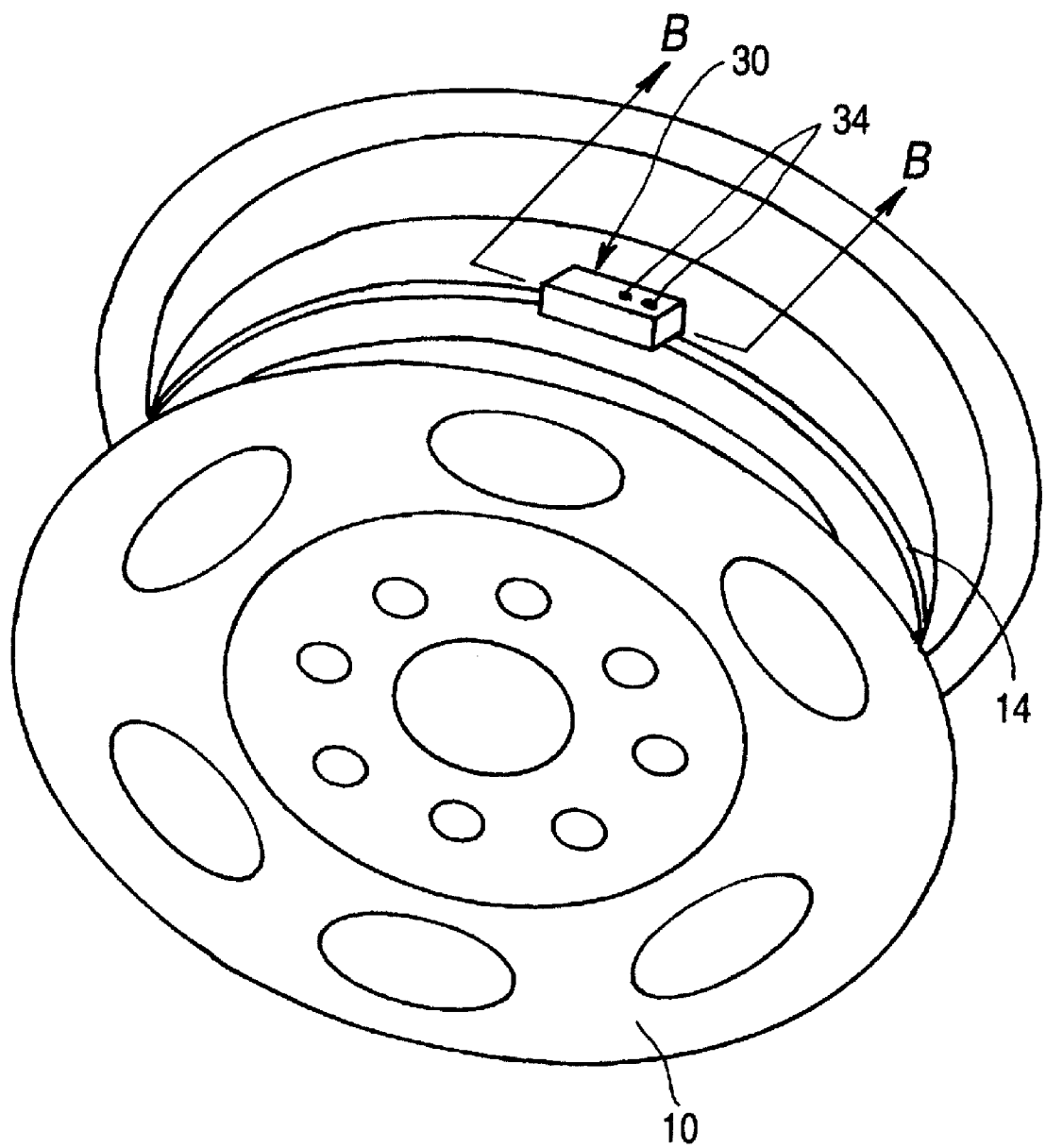
FIG. 1 is an external appearance perspective view in the case where the first embodiment of the tire air-pressure sensor of the present invention is arranged and fixed in a wheel.
Figure 2:
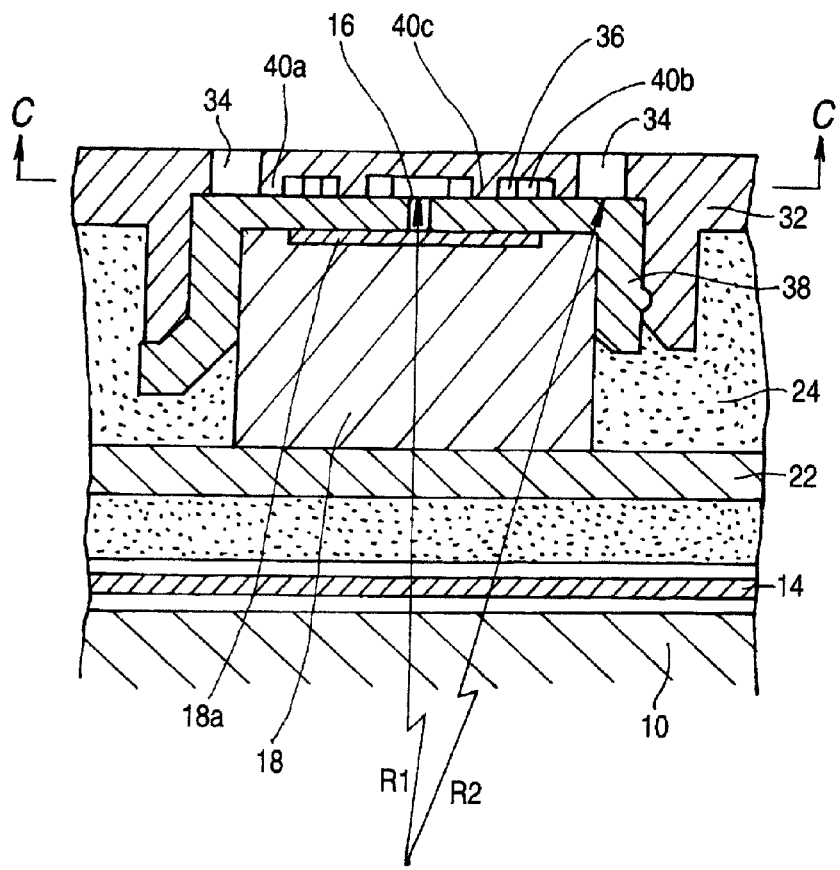
FIG. 2 is an enlarged view of that part of an air-pressure sensor element which corresponds to a section B-B in FIG. 1.
Figure 3:
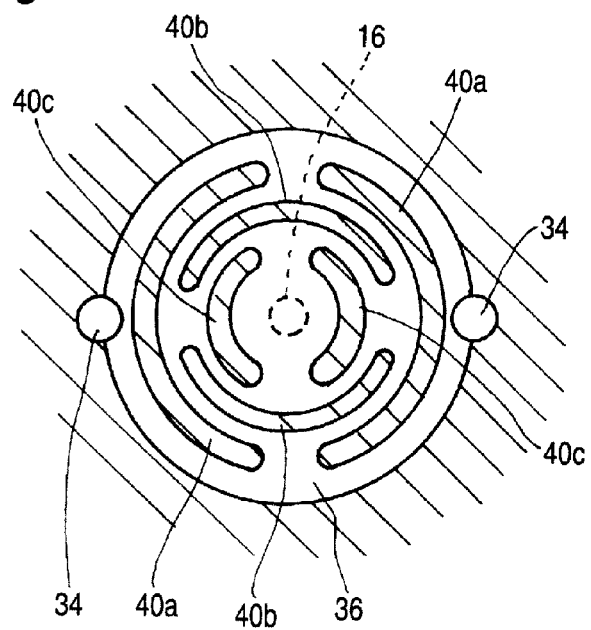
FIG. 3 is a view of a section C-C in FIG. 2 as seen along arrows.
Figure 4:
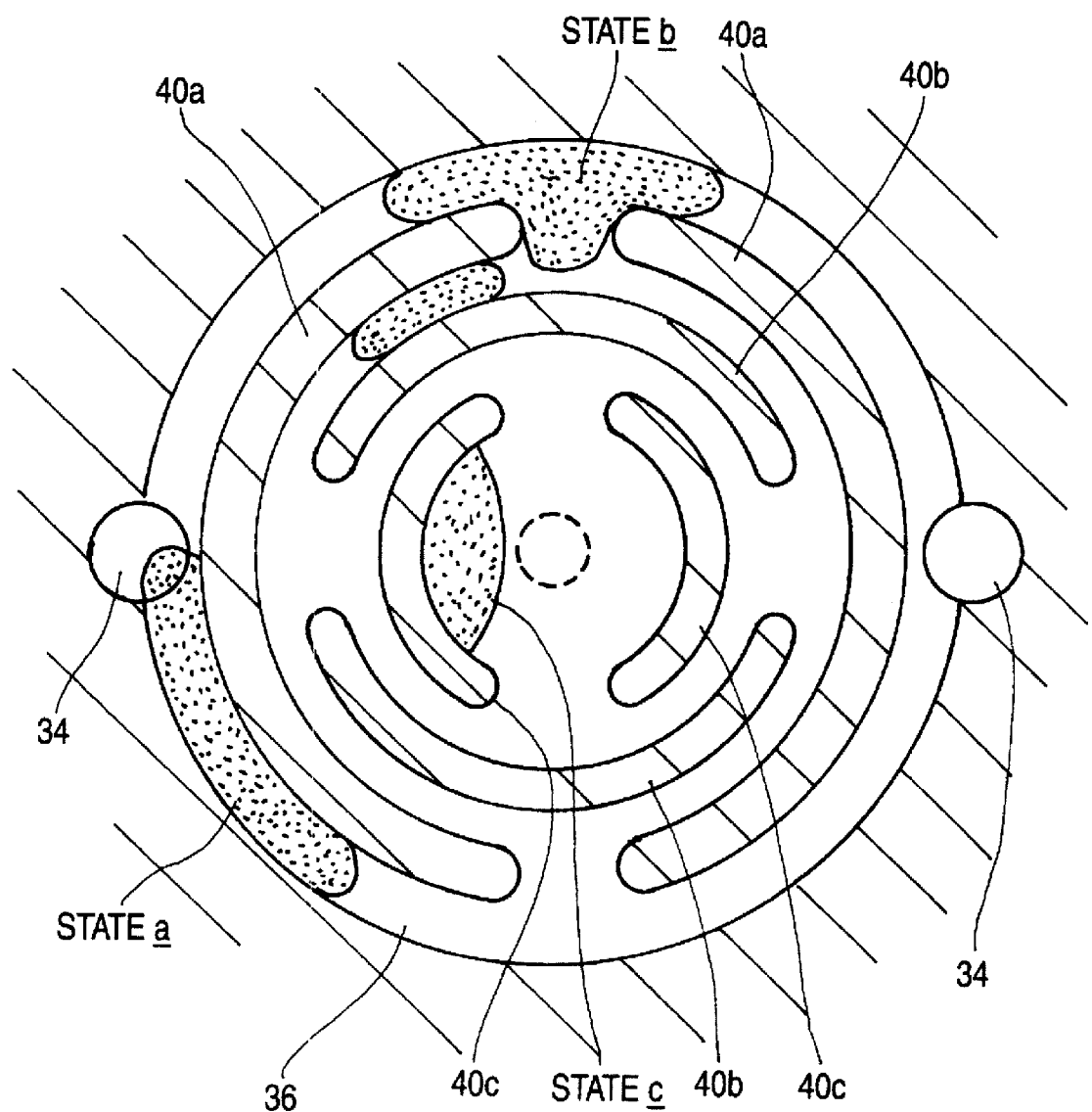
FIG. 4 is a view for explaining the fact that water having intruded into a communication passage is hard to move to the opening of an air vent hole.
Figure 11:
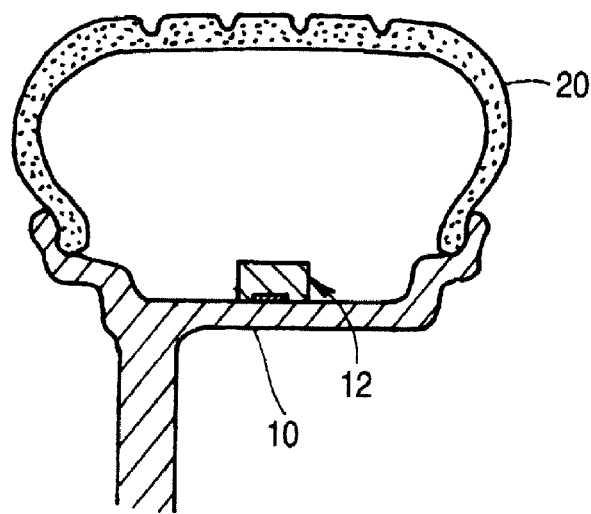
FIG. 11 is a sectional partial view in a radial direction, in the case where a tire is attached to a structure in FIG. 10.
Figure 12:
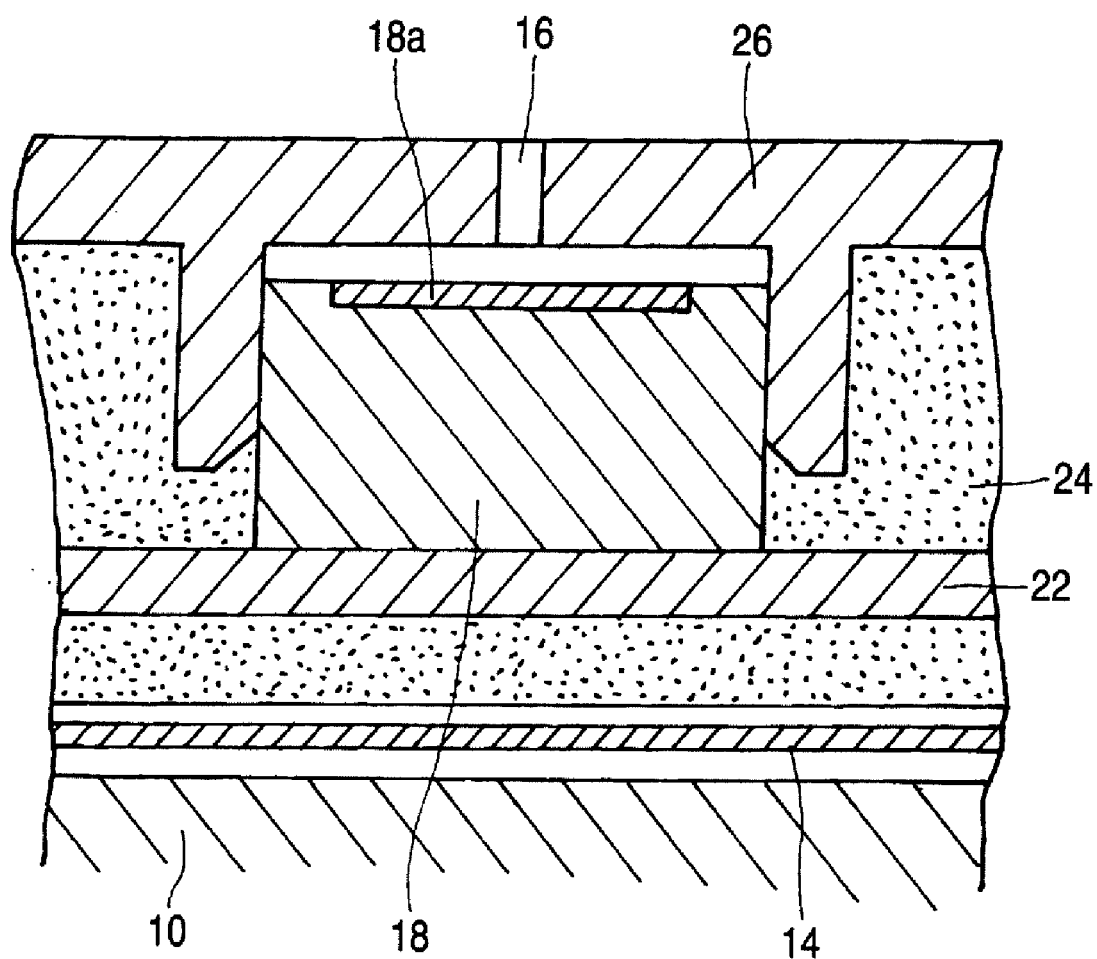
FIG. 12 is an enlarged view of that part of an air-pressure sensor element which corresponds to a section A-A in FIG.

Now, the first embodiment of the present invention will be described with reference to FIGS. 1 through 4. FIG. 1 is an external appearance perspective view in the case where the first embodiment of the tire air-pressure sensor of the invention is arranged and fixed in a wheel. FIG. 2 is an enlarged view of that part of an air-pressure sensor element which corresponds to a section B-B in FIG. 1. FIG. 3 is a view of a section C-C in FIG. 2 as seen along arrows. FIG. 4 is a view for explaining the fact that water having intruded into a communication passage is hard to move to the opening of an air vent hole. In FIGS. 1 through 4, members identical or equivalent to those in FIGS. 10 through 12 are assigned the same numerals and sign, and the repeated explanations thereof shall be omitted.

Figure 10:
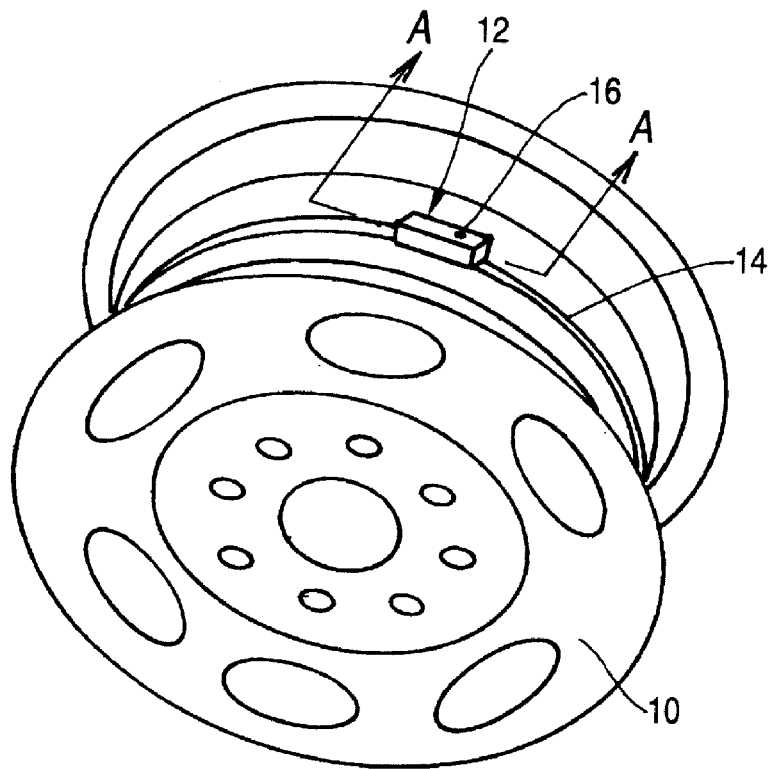
FIG. 10 is an external appearance perspective view in the case where a prior-art tire air-pressure sensor is arranged and fixed in a wheel.

As shown in FIG. 1, the tire air-pressure sensor 30 of the invention is appropriately arranged and fixed in the wheel 10 by a band 14, likewise to the prior-art example shown in FIG. 10. In addition, the tire air-pressure sensor is arranged with its crest side located on the outer side of the wheel 10 in the radial direction thereof, and two air holes 34 are formed in the crest portion of the case 32 of the tire air-pressure sensor in a manner to be positionally shifted in the rotating direction of the wheel 10. A cap 38 which is put on the air-pressure sensor element 18 arranged in the case 32 is provided with the air vent hole 16 communicating with the sensor portion 18a of the air-pressure sensor element 18, at the intermediate position between the two air holes 34. Moreover, the two air holes 34 and the opening of the air vent hole 16 are brought into communication by a communication passage 36, on a substantial plane normal to the radial direction of the wheel 10 (a substantial plane which is contiguous to a cylindrical surface being coaxial with the rotation axis of the wheel 10) and between the case 32 and the cap 38. The communication passage 36 is formed so as to have a meandering state by means of walls 40, 40 which are interposed between the air holes 34 and the opening of the air vent hole 16. In the first embodiment, first of all, two arcuate first walls 40a which oppose with gaps defined on both the end sides thereof are erected on the case 32 so as to block between the two air holes 34 and the opening of the air vent hole 16. Besides, two arcuate second walls 40b which are smaller in diameter than the first walls 40a and which oppose with gaps defined on both the end sides thereof are erected on the cap 38 so as to block between the gaps of the first walls 40a and the opening of the air vent hole 16. Further, two arcuate third walls 40c which are smaller in diameter than the second walls 40b and which oppose with gaps defined on both the end sides thereof are erected on the case 32 so as to block between the gaps of the second walls 40b and the opening of the air vent hole 16. By the way, in the first embodiment, the two air holes 34 and first-third walls 40a, 40b, and 40c are erected symmetrically in the rotating direction with respect to the opening of the air vent hole 16, and the communication passage 36 is formed to be symmetric with respect to the opening of the air vent hole 16.

In such a configuration, in a case where water has intruded into a tire 20 and has further intruded into the communication passage 36 from the air hole 34 and where a waterdrop lies in the communication passage 36 outside the first wall 40a as in, for example, a state a in FIG. 4, an air pressure in the tire acts equally from both sides through the both-side communication passages 36 communicating with the air holes 34, and the waterdrop stays in this place on account of the surface tension thereof. Besides, in a case where, as in a state b in FIG. 4, a waterdrop is about to intrude into the communication passage 36 between the first and second walls 40a and 40b, from the gap of the first walls 40a, the waterdrop is hard to intrude into the communication passage 36 between the first and second walls 40a and 40b on account surface tension thereof, and the air pressure in the tire 20 acts equally from all directions through the large number of communication passages 36 with which the waterdrop lie in touch, so that the waterdrop stays in this place. Further, in a case where, as in a state c in FIG. 4, a waterdrop is adherent on a surface inside the third walls 40c, the air pressure in the tire 20 acts so as to press the waterdrop against the third walls 40c, and the waterdrop does not reach the opening of the air vent hole 16 on account of the surface tension thereof.

In addition, when the vehicle has started suddenly or has stopped suddenly, a force in the rotating direction or in a direction reverse thereto acts also on the waterdrop in the communication passage 36, on account of an inertial force, and the waterdrop moves in the rotating direction or in the reverse direction within the communication passage 36. In the state a or the state b in FIG. 4, there is the possibility that the waterdrop will move to the air holes 34, and when the waterdrop has reached the air holes 34, it is discharged from the air holes 34 into the tire 20 by a centrifugal force based on the rotation of the wheel 10. Besides, as shown in FIG. 2, a radius R2 from the rotation axis of the wheel 10 to the air holes 34 is slightly larger than a radius R1 to the opening of the air vent hole 16, so that the centrifugal forces acting on the air holes 34 have gradients from the substantial plane in which the communication passage 36 is formed, thou gradients are slight, so that a component force in a direction from the opening side of the air vent hole 16 to the air holes 34 acts. As a result, the waterdrop in the communication passage 36 is moved onto the sides of the air holes 34 by the component until it is finally discharged from the air holes 34 into the tire 20.

In the first embodiment of the tire air-pressure sensor 30 of the invention, owing to the actions as stated above, the water having intruded into the tire 20 does not arrive at the sensor portion of the air-pressure sensor element 18 through the communication passage 36.

Figure 5:
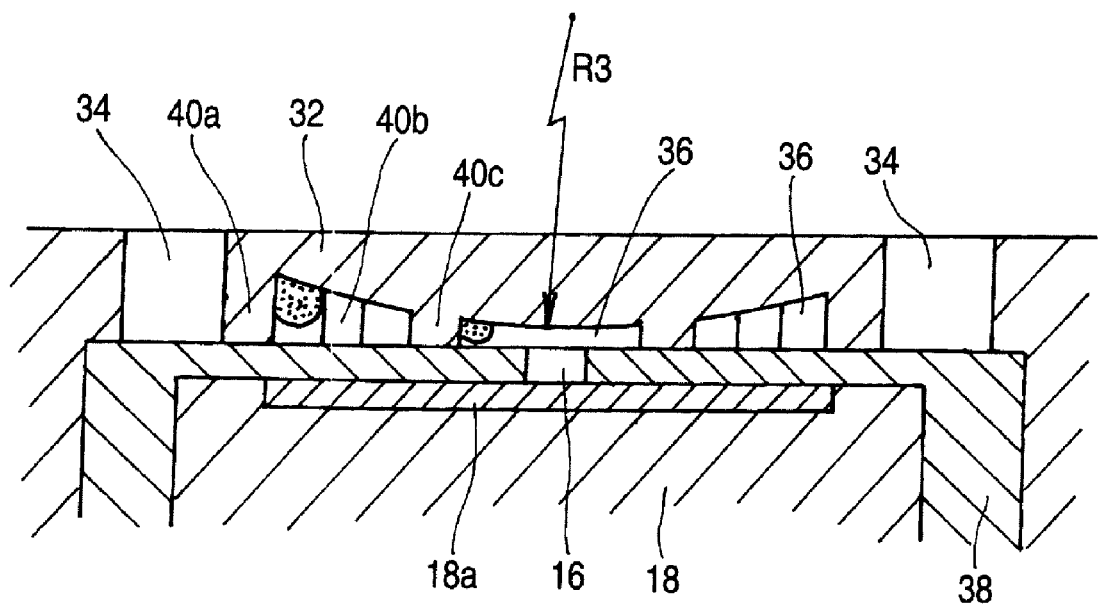
FIG. 5 is an enlarged view of the part of an air-pressure sensor element in the second embodiment of the tire air-pressure sensor of the invention.

Next, the second embodiment of the tire air-pressure sensor of the invention will be described with reference to FIG. 5. FIG. 5 is an enlarged view of the part of an air-pressure sensor element in the second embodiment of the tire air-pressure sensor of the invention. In FIG. 5, members identical or equivalent to those in FIGS. 1 through 4 are assigned the same numerals and sign, and the repeated explanations thereof shall be omitted.

In the second embodiment of the tire air-pressure sensor of the invention as shown in FIG. 5, the surface of a communication passage 36 on the crest side thereof is formed of part of a spherical surface of radius R3 as is convex on the inner side of a wheel 10 in the radial direction thereof and as is nearest to the opening of the air vent hole 16. Incidentally, walls 40, 40 which bring the communication passage 36 into a meandering state, that is, first third walls 40a, 40b, and 40c, are all erected on the side of a case 32.

In the second embodiment of such a configuration, a waterdrop within the communication passage 36 as has been subjected to a centrifugal force by the rotation of the wheel 10 is pressed against the surface of the communication passage 36 on the crest side thereof, and a water drop lying in the communication passage 36 between the first and second walls 40a and 40b is about to move from the gap of the first walls 40a into the communication passage 36 outside the first walls 40a. Besides, a waterdrop lying in the communication passage 36 between the second and third walls 40b and 40c is about to move from the gap of the second walls 40b into the communication passage 36 between the first and second walls 40a and 40b. Further, a waterdrop lying inside the third walls 40c is about to move from the gap of the third walls 40c into the communication passage 36 between the second and third walls 40b and 40c. Consequently, the waterdrops move onto the sides of air holes 34, and the movements of the waterdrops to the opening of an air vent hole 16 are hindered.

Incidentally, in case that, as a modification to the second embodiment shown in FIG. 5, the surface of the communication passage 36 on the crest side thereof is formed of a cylindrical surface which has an axis parallel rotation axis of the wheel 10 and which is convex onto the side of the opening of the air vent hole 16, a centrifugal force acts so that a waterdrop lying in the communication passage 36 between the second and third walls 40b and 40c may move from the gap of the second walls 40b into the communication passage 36 between the first and second walls 40a and 40b. Besides, as a further modification to the embodiment shown in FIG. 5, when the surface of the communication passage 36 on the crest side thereof is formed of a cylindrical surface which has an axis touching the rotating direction of the wheel 10 and which is convex onto the side of the opening of the air vent hole 16, a centrifugal force acts so that a waterdrop lying in the communication passage 36 between the first and second walls 40a and 40b may move from the gap of the first walls 40a and 40a into the communication passage 36 outside the first walls 40a, and a centrifugal force acts so that a waterdrop lying in the communication passage 36 inside the third walls 40c may move from the gap of the third walls 40c into the communication passage 36 between the second and third walls 40b and 40c.

Figure 6:
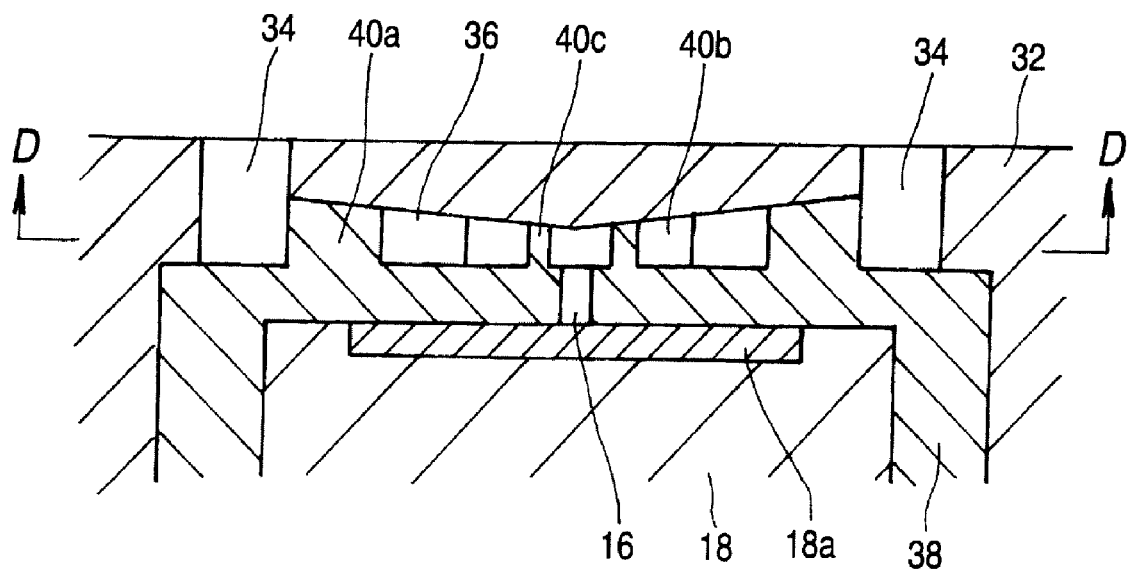
FIG. 6 is an enlarged view of the part of an air-pressure sensor element in the third embodiment of the tire air-pressure sensor of the invention.
Figure 7:
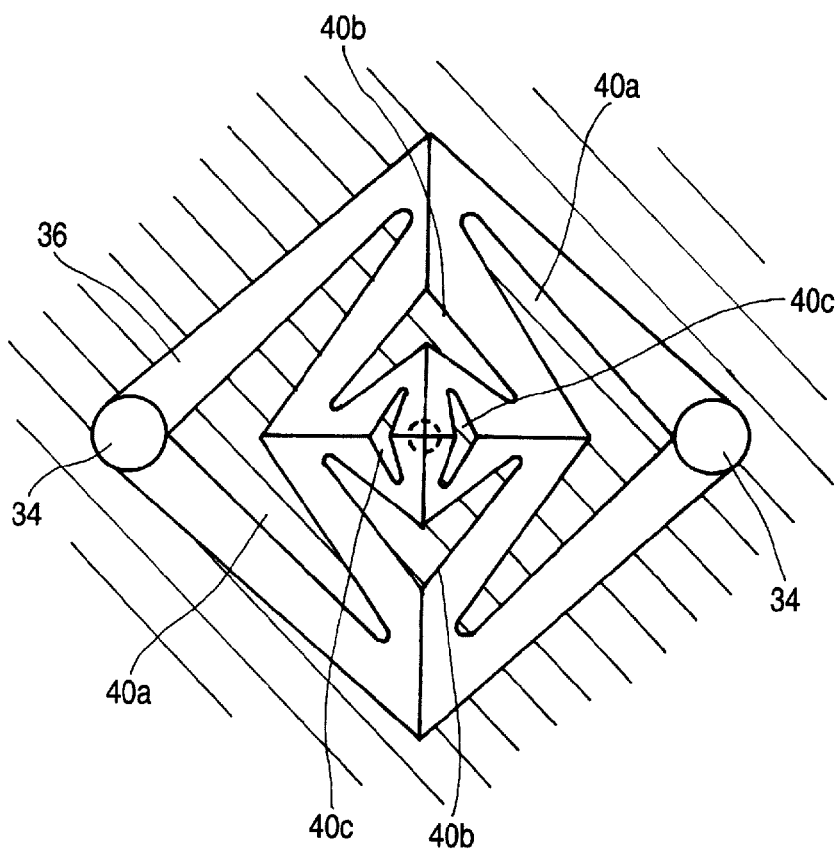
FIG. 7 is a view of a section D-D in FIG. 6 as seen along arrows.

Next, the third embodiment of the tire air-pressure sensor of the invention will be described with reference to FIGS. 6 and 7. FIG. 6 is an enlarged view of the part of an air-pressure sensor element in the third embodiment of the tire air-pressure sensor of the invention. FIG. 7 is a view of a section D-D in FIG. 6 as seen along arrows. In FIGS. 6 and 7, members identical or equivalent to those in FIGS. 1 through 5 are assigned the same numerals and signs, and the repeated explanations thereof shall be omitted.

In the third embodiment of the tire air-pressure sensor of the invention as shown in FIGS. 6 and 7, the surface of a communication passage 36 on the crest side thereof is formed of part of a quadrangular pyramidal surface which is convex on the inner side of a wheel 10 in the radial direction thereof and whose top portion is confronted to the opening of an air vent hole 16. Moreover, the communication passage 36 has its rectilinear passages held in a meandering state, and the individual rectilinear passages are set so that, as the passages are nearer to air holes 34 and the passage lengths thereof from the opening of the air vent hole 16 becomes longer, the passages may lie at positions remoter from the top portion of the quadrangular pyramidal surface, in other words, that the straight distances of the passages from the opening of the air vent hole 16 may become longer. Incidentally, first to third walls 40a, 40b, and 40c are all erected on the side of a cap 38.

In the third embodiment of such a configuration, the rectilinear passages of the communication passage 36 in the meandering state are subjected to a larger centrifugal force on the side nearer to the air holes 34, by the rotation of the force extending along the quadrangular pyramidal surface acts, so that waterdrop having intruded into the communication passage 36 is moved onto the sides of the air holes 34. Incidentally, the waterdrop within the communication passage 36 as has undergone the centrifugal force is pressed against the surface of the communication passage 36 on the crest side thereof, and a waterdrop lying in the communication passage 36 between the first and second walls 40a and 40b is about to move from the gap of the first walls 40a into the communication passage 36 outside the first walls 40a. Besides, a waterdrop lying in the communication passage 36 between the second and third walls 40b and 40c is about to move from the gap of the second walls 40b into the communication passage 36 between the first and second walls 40a and 40b. Further, a waterdrop lying inside the third walls 40c is about to move from the gap of the third walls 40c into the communication passage 36 between the second and third walls 40b and 40c.

Figure 8:
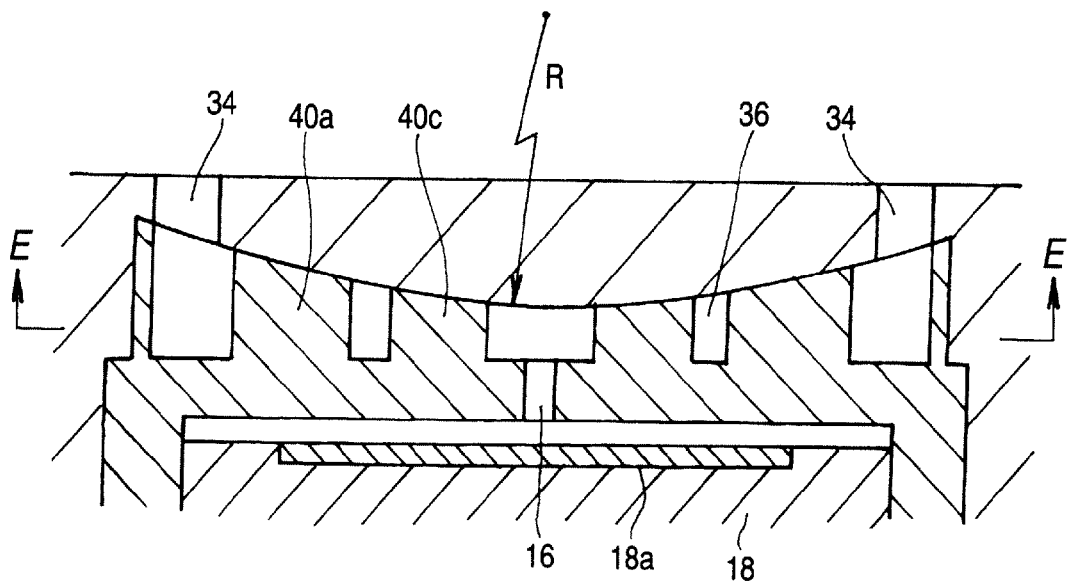
FIG. 8 is an enlarged view of the part of an air-pressure sensor element in the fourth embodiment of the tire air-pressure sensor of the invention.
Figure 9:
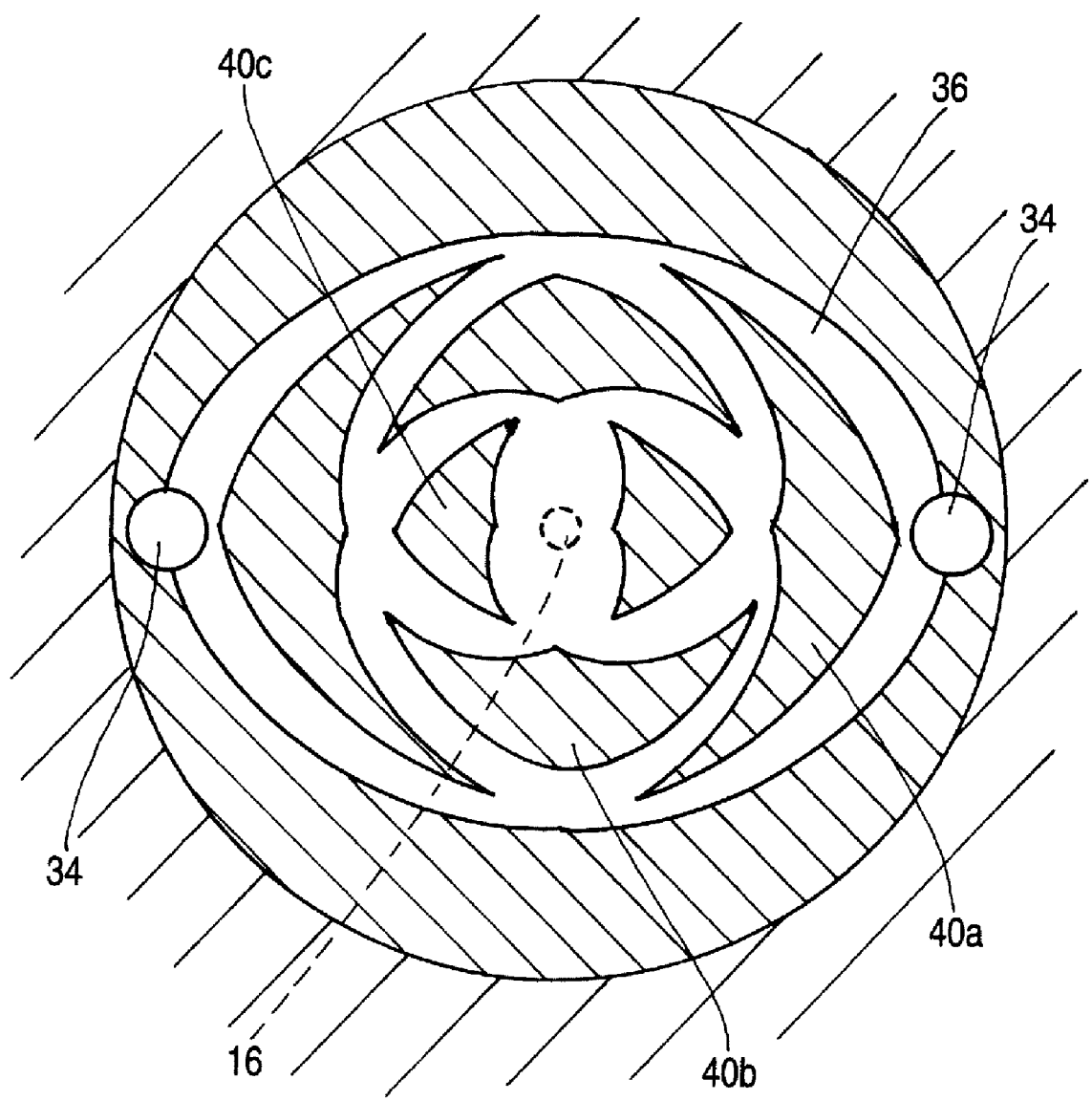
FIG. 9 is a view of a section E-E in FIG. 8 as seen along arrows.

Further, the fourth embodiment of the tire air-pressure sensor of the invention will be described with reference to FIGS. 8 and 9. FIG. 8 is an enlarged view of the part of an air-pressure sensor element in the fourth embodiment of the tire air-pressure sensor of the invention. FIG. 9 is a view of a section E-E in FIG. 8 as seen along arrows. In FIGS. 8 and 9, members identical or equivalent to those in FIGS. 1 through 7 are assigned the same numerals and signs, and the repeated explanations thereof shall be omitted.

In the fourth embodiment of the tire air-pressure sensor of the invention as shown in FIGS. 8 and 9, the surface of a communication passage 36 on the crest side thereof is formed of a spherical surface which is convex onto the inner side of a wheel 10 in the radial direction thereof and which comes nearest to the opening of an air vent hole 16. Moreover, the individual passages of the communication passage 36 in a meandering state are formed of parabolic curves, and they are set so that, as the passage lengths thereof from the opening of the air vent hole 16 are larger, the straight distances thereof from the opening of the air vent hole 16 may become longer.

In the fourth embodiment of such a configuration, the communication passage 36 undergoes a larger centrifugal force as the distance of the passage length from the opening of the air vent hole 16 is longer, and a waterdrop is hard to intrude into the communication passage 36. Besides, a waterdrop within the communication passage 36 is moved onto the sides of air holes 34 along the spherical surface of a crest surface, by the centrifugal force, until it is finally discharged into a tire 20.

By the way, in the embodiments, the meandering-state shapes of the communication passages 36 as are formed by the walls 40 are not restricted to ones illustrated in the embodiments, but they may be formed so that the movement of the waterdrop from the air holes 36 to the opening of the air vent hole 16 may be hindered. Besides, in the embodiments, the communication passage 36 and the air holes 34 are symmetrically provided in the rotating direction with respect to the opening of the air vent hole 16, but they may well be asymmetrically provided without being restricted to the symmetric provisions. Further, the sensor portion 18a of the air-pressure sensor element 18 is arranged facing the opening of the air vent hole 16, but the air vent hole 16 may well be brought into communication with the sensor portion 18a through a still another passage, without being restricted to the illustrated arrangement.

The invention claimed is:

1. A tire air-pressure sensor characterized by being so configured that said tire air-pressure sensor is arranged and fixed in a wheel with its outer side in a radial direction of the wheel located as a crest side; that two air holes are formed in a crest portion of a case of said tire air-pressure sensor in a manner to be positionally shifted in a rotating direction of the wheel; that an opening of an air vent hole communicating with an air-pressure sensor element is formed in a cap which is put on the air-pressure sensor element arranged in the case, at an intermediate position between the two air holes in the rotating direction; that the two air holes and the opening of the air vent hole are brought into communication by a communication passage on a substantial plane normal to the radial direction of the wheel, between the crest portion of the case and the cap; and that walls are interposed between the air holes and the opening of the air vent hole so as to bring the communication passage into a meandering state.

2. The tire air-pressure sensor as defined in claim 1, characterized by being so configured that the communication passage becomes symmetric in the rotating direction with respect to the opening of the air vent hole.

3. The tire air-pressure sensor as defined in claim 1, characterized by being so configured that a surface of the communication passage on the crest side forms part of a spherical surface which is convex onto an inner side in the radial direction and which comes nearest to the opening of the air vent hole.

4. The tire air-pressure sensor as defined in claim 1, characterized by being so configured that a surface of the communication passage on the crest side forms part of a conical surface which is convex onto an inner side in the radial direction and which has an apex at a position confronting the opening of the air vent hole.

5. The tire air-pressure sensor as defined in claim 1, characterized by being so configured that a surface of the communication passage on the crest side forms part of a cylindrical surface which is convex onto an inner side in the radial direction, which has an axis parallel to a rotation axis of the wheel and which comes nearest to the opening of the air vent hole.

6. The tire air-pressure sensor as defined in claim 1, characterized by being so configured that a surface of the communication passage on the crest side forms parts of two oblique surfaces which are convex onto an inner side in the radial direction, which have edges parallel to a rotation axis of the wheel at a position confronting the opening of the air vent hole and which form a V-shaped section.

7. The tire air-pressure sensor as defined in claim 3 or 4, characterized by being so configured that a surface of the communication passage facing an air vent hole side of the walls becomes longer in a straight distance from the opening of the air vent hole as a passage length of the communication passage from the opening of the air vent hole is larger.

* * * * *